(12) United States Patent
Williams et al.

(10) Patent No.: US 12,066,074 B1
(45) Date of Patent: Aug. 20, 2024

(54) COMPLIANT-VOLUME MOTION MODIFICATION SYSTEM AND METHOD

(71) Applicant: United States of America as represented by the Administrator of NASA, Washington, DC (US)

(72) Inventors: Rebecca L. Williams, Huntsville, AL (US); Robert E. Berry, Madison, AL (US); Frederick Scott Gant, Huntsville, AL (US); Jeffrey L. Lindner, Huntsville, AL (US); John S. Townsend, Union Grove, AL (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 17/935,834

(22) Filed: Sep. 27, 2022

(51) Int. Cl.
  *F16F 7/10* (2006.01)
  *B63B 25/14* (2006.01)
  *B63B 25/24* (2006.01)
  *B65D 90/52* (2006.01)

(52) U.S. Cl.
  CPC ............ *F16F 7/1034* (2013.01); *B63B 25/14* (2013.01); *B63B 25/24* (2013.01); *B65D 90/52* (2013.01)

(58) Field of Classification Search
  CPC .. F16F 7/015; F16F 9/02; F16F 9/3235; F16F 7/1034; H05K 2201/2045; B64C 27/001; B65B 5/08; B63B 25/14; B63B 25/24; B63B 35/44; B63B 39/03; B63B 39/02; B63B 79/15; B65D 90/52; F03D 9/30
  See application file for complete search history.

(56) References Cited

U.S. PATENT DOCUMENTS

| | | | | |
|---|---|---|---|---|
| 2,889,795 | A * | 6/1959 | Parks | B63B 39/03 405/195.1 |
| 3,316,871 | A * | 5/1967 | Augustine | B63B 39/08 114/67 A |
| 4,176,614 | A * | 12/1979 | Goss | B63B 39/03 405/200 |
| 4,207,828 | A * | 6/1980 | Horowitz | B63B 43/06 441/29 |
| 4,366,766 | A * | 1/1983 | Bergman | B63B 39/02 114/125 |

(Continued)

FOREIGN PATENT DOCUMENTS

| | | | |
|---|---|---|---|
| CN | 112939211 B | * | 8/2022 |
| WO | WO 2020/093037 A2 | | 5/2020 |

*Primary Examiner* — Robert A. Siconolfi
*Assistant Examiner* — Mahbubur Rashid
(74) *Attorney, Agent, or Firm* — Jerry L. Seemann; Trenton J. Roche

(57) ABSTRACT

A system and method for modifying motion of a liquid is provided. Containers are disposed within a liquid contained within a tank. Each container has an open end. Each container is disposed in the liquid such that a portion of the liquid fills a portion of each container to seal its open end. A remainder of each container is filled with a gas. At least one gas pressurization source is in fluid communication with the remainder or gas-containing portion of at least one of the containers for pressurizing the gas therein. Pressure is applied to the gas in each container. For each container, the portion of the liquid contained therein and the pressure applied to the gas therein cooperate to modify movement of the liquid in the tank.

28 Claims, 5 Drawing Sheets

(56) References Cited

U.S. PATENT DOCUMENTS

| | | | | |
|---|---|---|---|---|
| 4,864,958 | A | * | 9/1989 | Belinsky ................ B63B 13/00 |
| | | | | 114/265 |
| 5,375,550 | A | * | 12/1994 | Innis ...................... B63B 43/12 |
| | | | | 114/267 |
| 6,910,438 | B2 | * | 6/2005 | Leverette ............. B63B 39/005 |
| | | | | 114/265 |
| 11,235,695 | B2 | * | 2/2022 | Carpenter .............. B65D 90/52 |
| 11,279,452 | B2 | * | 3/2022 | Allen ..................... B63B 39/03 |
| 2015/0008235 | A1 | * | 1/2015 | Khoshsepehr ........ B60P 3/2235 |
| | | | | 220/734 |
| 2021/0269126 | A1 | * | 9/2021 | Allen ..................... B63B 39/03 |
| 2022/0250723 | A1 | * | 8/2022 | Hutcheson ............. F03B 13/10 |

\* cited by examiner

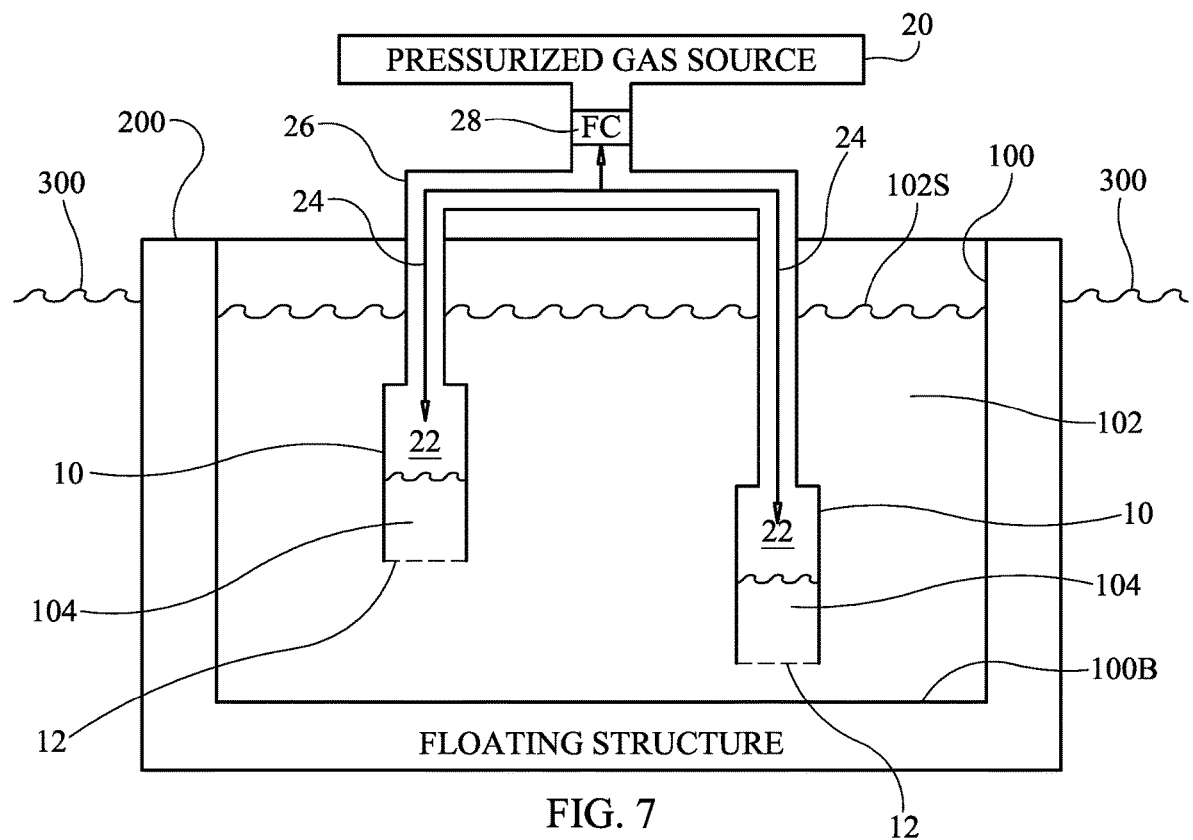
FIG. 7
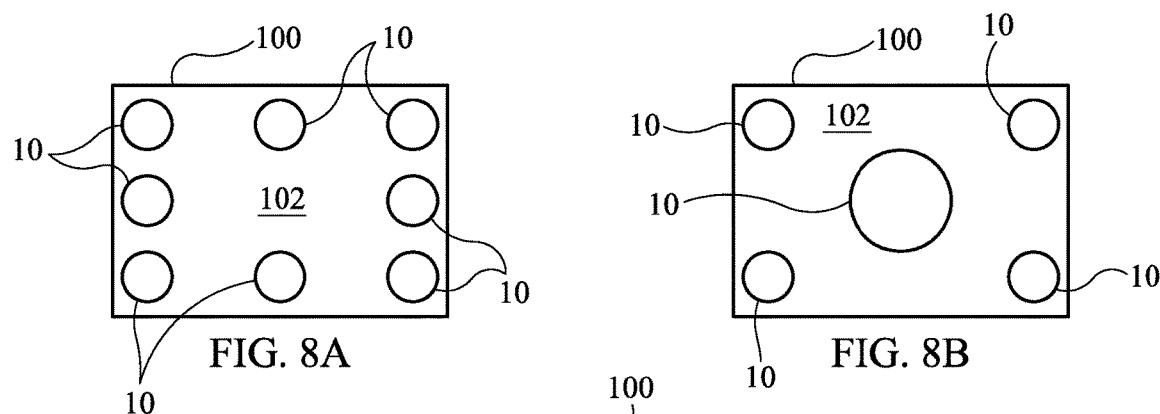
FIG. 8A FIG. 8B
FIG. 8C

COMPLIANT-VOLUME MOTION MODIFICATION SYSTEM AND METHOD

ORIGIN OF THE INVENTION

The invention described herein was made in the performance of work under a NASA contract and by an employee of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected to retain title.

BACKGROUND OF THE INVENTION

Field of the Invention

This invention relates to liquid motion modification. More specifically, the invention is a system for modifying the motion of a liquid contained within a tank caused by motion of the tank and any structure coupled thereto.

Description of the Related Art

A variety of maritime structures floating at the surface of a body of water (e.g., ships, oil tankers, barges, wind turbines, etc.) are subject to wave and/or wind excitation that can cause a structure to experience pitch, roll, and/or heave motions that can limit the performance of the structure. In addition, such externally-induced motion of maritime structures often reduces the lifespan thereof owing to structural degradation brought on by unmitigated wave-induced motion.

Performance and structural degradation of maritime structures are greatly exacerbated in the face of high-amplitude wave excitation. There are multiple families of existing tuned mass dampers and tuned vibration absorbers that are used for a variety of motion-damping applications across multiple industries. However, conventional motion dampers are not capable of damping the range of motion amplitudes and motion frequencies experienced by maritime structures in open water environments.

SUMMARY OF THE INVENTION

Accordingly, it is an object of the present invention to provide motion damping for maritime structures.

Another object of the present invention is to provide motion damping for installation on structures floating on the surface of a body of water.

Other objects and advantages of the present invention will become more obvious hereinafter in the specification and drawings.

In accordance with the present invention, a system for modifying motion of a liquid contained within a tank includes a plurality of containers. Each container has an open end. Each container is disposed in a liquid contained within a tank such that a portion of the liquid fills a portion of each container to seal its open end. A remainder of each container is filled with a gas. At least one gas pressurization source is in fluid communication with the remainder or gas-containing portion of at least one of the containers for pressurizing the gas therein. In accordance with a method of the present invention, pressure is applied to the gas in each container. For each container, the portion of the liquid contained therein and the pressure applied to the gas therein cooperate to modify movement of the liquid in the tank.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein:

FIG. 7 is a schematic view of a multiple-container compliant-volume system for modifying motion of a liquid in a tank in which the containers are positioned at different depths in the tank's liquid in accordance with another embodiment of the present invention;

FIG. 8A is an isolated plan view of a tank of liquid illustrating a plurality of compliant-volume containers distributed about the periphery of the tank in accordance with an embodiment of the present invention;

FIG. 8B is an isolated plan view of a tank of liquid illustrating a plurality of compliant-volume containers distributed throughout the tank in accordance with another embodiment of the present invention;

Figure 9:
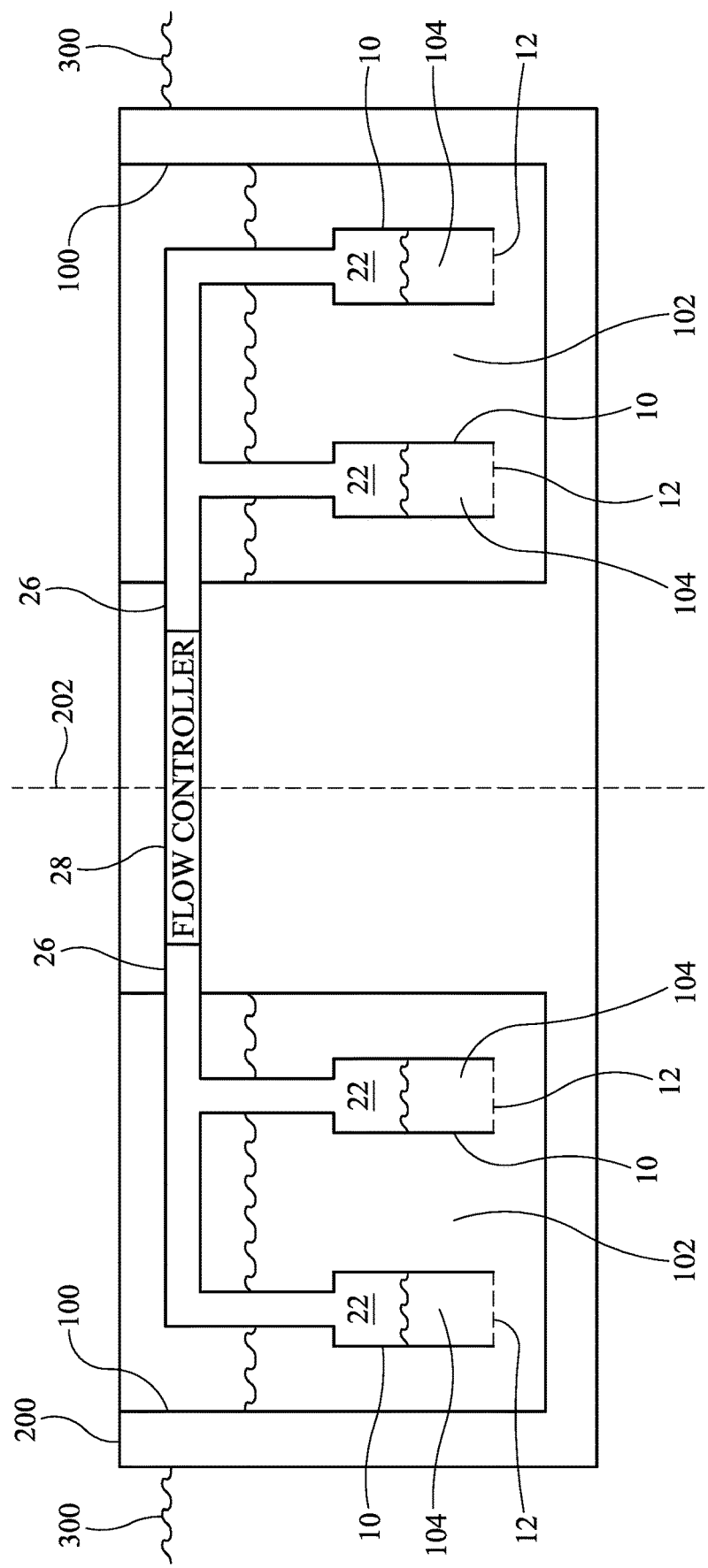

FIG. 8C is an isolated plan view of a tank of liquid illustrating a plurality of compliant-volume containers clustered in the central region of the tank in accordance with another embodiment of the present invention; and FIG. 9 is a schematic view of a floating structure having multiple ballast tanks and corresponding compliant-volume systems for modifying motion of the ballast water in the tanks in accordance with an embodiment of the present invention.

DESCRIPTION OF THE PREFERRED EMBODIMENT(S)

The present invention is a novel system and method for modifying the motion of liquid in a tank. In general, the goal is to reduce or damp motion of a tank's liquid in an effort to reduce or damp motion of the tank as well as any primary structure that supports the tank. While the present invention can be adapted for use with primary structures that are land-based or water-based, the description to follow will be directed to primary structures that float on the surface of a body of water. The floating structures can be any fixed or movable "platform" configured for floating at the surface of a body of water, e.g., a river, lake, bay, ocean, etc. Examples of such floating structures include, but are not limited to, ships, oil tankers, barges, and wind turbines.

In general, most of the above-mentioned floating structures include ballast tanks partially filled with a ballast liquid (e.g., water) to control the structure's buoyancy as is well understood in the art. However, as a floating structure is subjected to externally-induced motion, the ballast water in its ballast tanks is excited to motion that can continue to impact the floating structure even after the source (e.g., waves, wind, etc.) of the externally-induced motion subsides. As will be explained further below, the present invention provides a technique and system for modifying the motion of a tank's liquid to thereby change the motion dynamics of the primary structure that supports the tank.

Figure 1:
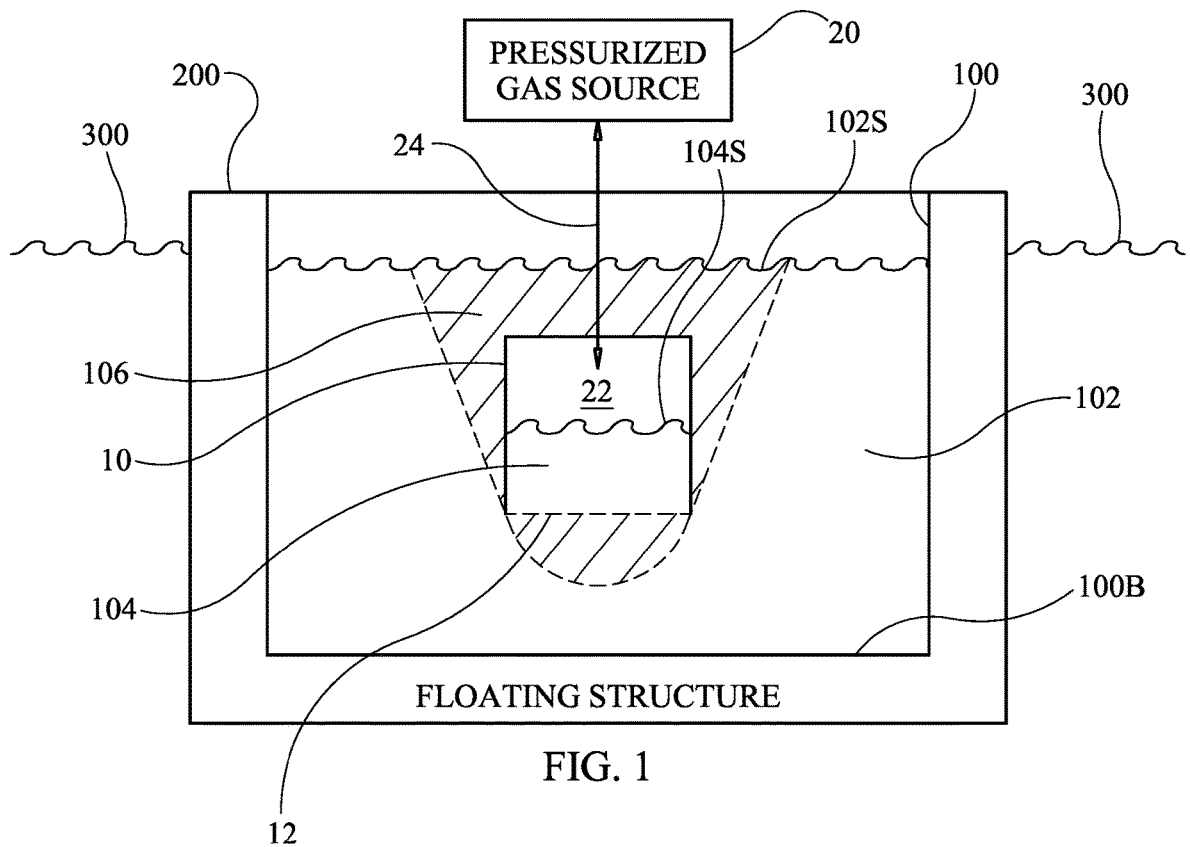
FIG. 1 is a schematic view illustrating the compliant-volume technique for modifying motion of a liquid in a tank in accordance with the present invention.

Referring now to the drawings and more particularly to FIG. 1, a schematic view of a tank 100 having a liquid 102 (referred to hereinafter as "tank liquid 102") therein is illustrated. It will be assumed that tank 100 is coupled to a supporting (primary) structure 200. For example, structure 200 can be a floating structure designed to float at the surface of a body of water 300. Accordingly, tank 100 can be a ballast tank with tank liquid 102 being ballast water.

The present invention applies what will be referred to herein as a compliant-volume technique to modify the motion of tank liquid 102. The basics of this novel technique will be described for a single compliant-volume system that includes a container 10 and a pressurized gas source 20 coupled to container 10. In general, container 10 is a rigid container having an open end indicated by dashed line 12. Container 10 is positioned in tank liquid 102 such that a relatively small volume 104 of tank liquid 102 fills a portion of container 10 and seals its open end 12. The volume 104 of tank liquid 102 will be referred to hereinafter as "container liquid 104". The remainder of container 10 is filled with a gas 22 (hereinafter referred to as "container gas 22") that directly interfaces with the free surface 104S of container liquid 104. Container gas 22 can be air or any other suitable inert gas. In some embodiments of the present invention, container 10 is fixed at its position in tank liquid 102 by, for example, use of supports (not shown) coupled to tank 100 and/or floating structure 200. In some embodiments of the present invention, container 10 is positioned in tank liquid 102 such that open end 12 faces the bottom 100B of tank 100 as illustrated.

Pressurized gas source 20 is provided onboard floating structure 200 and is coupled to container 10 in any of a variety of ways in order to pressurize container gas 22. Source 20 can be a reservoir of pressurized gas, a gas compressor, or combinations thereof without departing from the scope of the present invention. The pressurization of container gas 22 is controlled by the flow thereof into or out of container 10 as indicated by two-headed arrow 24. A variety of mechanism(s) can be used to support flow 24 without departing form the scope of the present invention.

Figure 2:
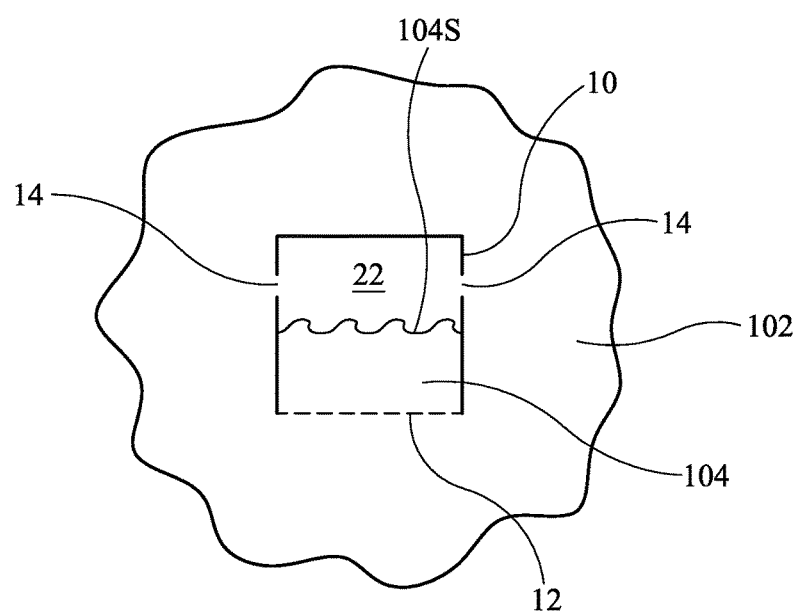
FIG. 2 is an isolated schematic view of a compliant-volume container having one or more ports that define a minimum amount of tank liquid that will be contained therein for some embodiments of the present invention.

In operation, primary/floating structure 200 is subjected to external excitation forces such as waves or wind. Without the present invention, tank liquid 102 will move with primary/floating structure 200. In accordance with the present invention, a compliant volume is created in tank liquid 102 in order to modify motion of tank liquid 102. Briefly, container 10 is placed in tank liquid 102 at a desired depth thereof, and container gas 22 is pressurized to set the height or volume of container liquid 104 in container 10. Based on the dimensions of container 10, location of container 10 in tank liquid 102 (i.e., both vertical and horizontal locations), and the location of free surface 104S based on the amount of tank liquid 102 in tank 100, an amount of tank liquid 102 can be controlled in terms of its motion within tank 100. The controlled amount of tank liquid 102 (also referred to herein as "compliant volume") is indicated by the hatched region indicated by reference numeral 106. Compliant volume 106 is used to determine the frequency and working mass of the motion modification system. The height of container liquid 104 in container 10, which is directly related to the pressure of container gas 22, also affects the frequency of the motion modification system. In some embodiments of the present invention, container 10 can include one or more ports 14 in the side walls thereof as shown in FIG. 2. Ports 14 are in fluid communication with tank liquid 102 to define a minimum height for container liquid 104 in container 10.

As primary/floating structure 200 is excited, compliant volume 106 moves with container liquid 104 and not with primary/floating structure 200 or the rest of tank liquid 102 outside of compliant volume 106. The pressure of container gas 22, as determined by gas flow 24, is used to set the phase between the motion of compliant volume 106 and the motion of primary/floating structure 200. This reassignment and prescription of mass motion changes the dynamics of primary/floating structure 200 leading to mitigation of high gain modes.

As primary/floating structure 200 moves due to external excitation, the height of container liquid 104 moves up or down in container 10 due to pressure changes in tank 100. Movement of container liquid 104 generates a corresponding response in compliant volume 106. The pressurization of container gas 22 acts as a damping element to apply a resistive force to the gas flow 24 as container liquid 104 moves. Control of gas flow 24 can be achieved in a variety of ways without departing from the scope of the present invention. For example, gas flow 24 can be controlled by a reed valve, variable aperture valve, orifice, or any other type of flow controller. The resistive force applied by container gas 22 is used to set the relative phase between the motion of primary/floating structure 200 and the motion of container liquid 104.

The effected mass of compliant volume 106 is combination of the projected hemispherical volume underneath open end 12 of container 10 and an upward radiative conical volume extending up to the free surface 102S of tank liquid 102. The captured fluid mass of compliant volume 106 responds to the motion of container liquid 104 and not the motion of primary structure 200. By decoupling compliant volume 106 from primary/floating structure 200 in this way, the motion of tank liquid 102 can be modified (e.g., damped) such that primary/floating structure 200 reacts less to the external excitation acting thereon.

The system and method of the present invention utilize a plurality of the above-described compliant volumes to provide for tunable and high-performance liquid-motion modification that can be configured to modify/damp high-amplitude motion experienced by floating structures. The use of multiple compliant volumes allows for adjustable target frequency in a multitude of ways. The overall system frequency can be adjusted by changing the height of container liquids in the multiple corresponding containers via pressure adjustments of the corresponding container gases, adjusting the fill level of the tank liquid, and/or turning "off" some of the compliant volumes.

Figure 3:
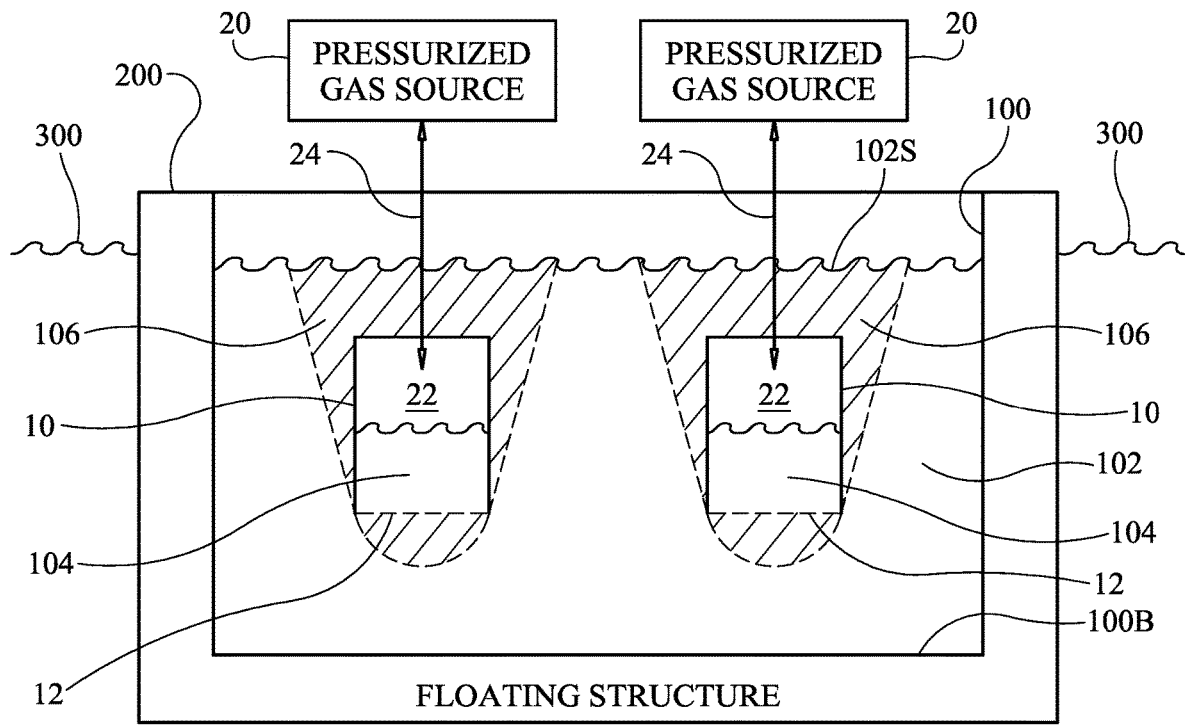
FIG. 3 is a schematic view of a multiple-container compliant-volume system for modifying motion of a liquid in a tank in accordance with an embodiment of the present invention.
Figure 4:
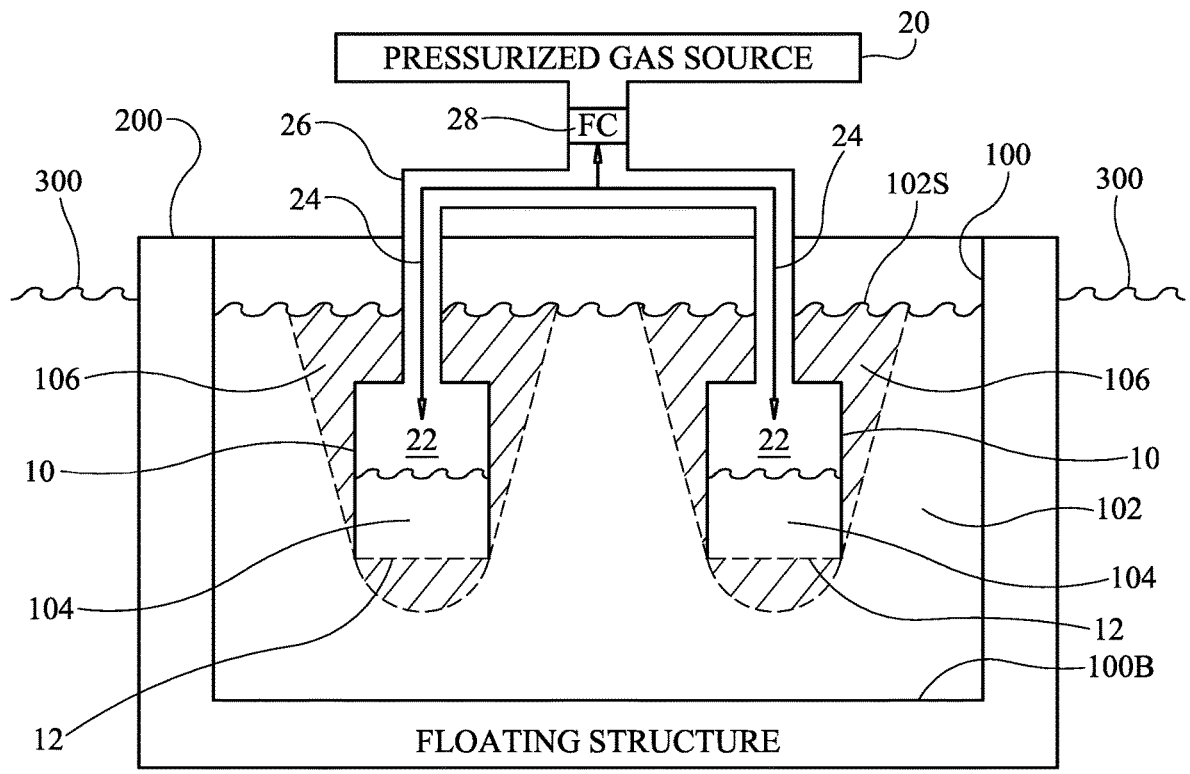
FIG. 4 is a schematic view of a multiple-container compliant-volume system for modifying motion of a liquid in a tank in accordance with another embodiment of the present invention.

Referring now to FIG. 3, a multiple-container, multiple compliant-volume system for modifying motion of tank liquid 102 is illustrated in accordance with an embodiment of the present invention. While two containers 10 and their dedicated pressurized gas sources 20 are illustrated, it is to be understood that additional containers and corresponding pressurized gas sources can be used without departing from the scope of the present invention. In this embodiment, each container 10/source 20 combination controls its own compliant volume 106 as described above. The use of a dedicated pressurized gas source for each container simplifies tuning control and can be used to provide system redundancy, albeit at the expense associated with multiple pressurized gas sources. Accordingly and as illustrated in FIG. 4, a single gas pressurization source 20 can be coupled to multiple containers 10 via a manifold 26. Gas flow 24 into and out of each container 10 can be controlled by a flow controller ("FC") 28, the design of which is not a limitation of the present invention.

Figure 5:
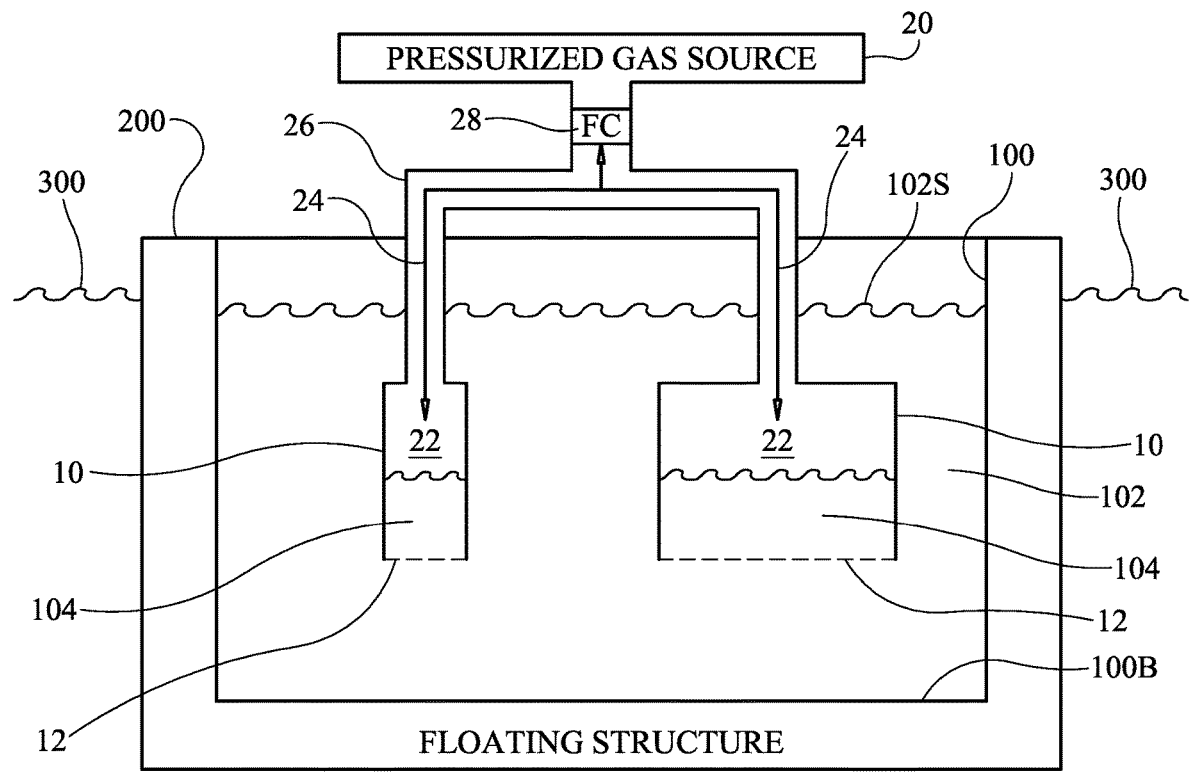
FIG. 5 is a schematic view of a multiple-container compliant-volume system for modifying motion of a liquid in a tank using different sizes of containers in accordance with another embodiment of the present invention.
Figure 6A:
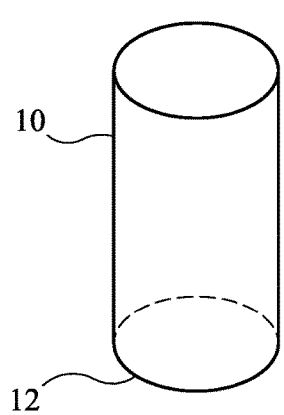
FIG. 6A is an isolated perspective view of a cylindrical container in accordance with an embodiment of the present invention.
Figure 6B:
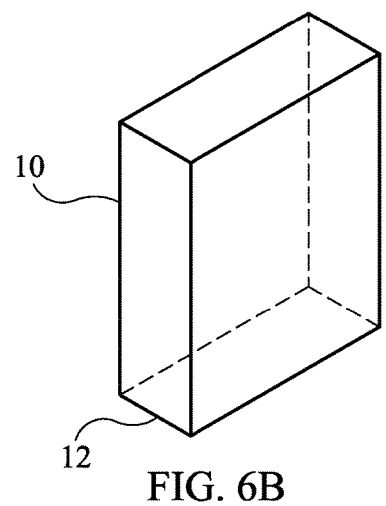
FIG. 6B is an isolated perspective view of a rectangular container in accordance with another embodiment of the present invention.
Figure 6C:
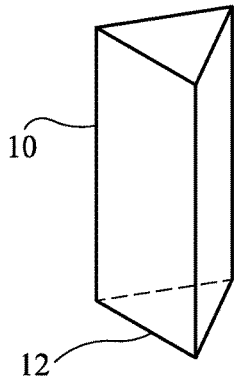
FIG. 6C is an isolated perspective view of a triangular container in accordance with another embodiment of the present invention.

When a single gas pressurization source is used, the system's frequency tuning can be achieved in a variety of ways. For example, containers 10 can be varied in size as illustrated in FIG. 5. Additionally or alternatively, the shape of the containers can be the same or varied throughout a compliant volume system. By way of non-limiting examples, container 10 can be a cylindrical container as shown in FIG. 6A, a rectangular containers as shown in FIG. 6B, a triangular container as shown in FIG. 6C, or any other container shape without departing from the scope of the present invention. Additionally or alternatively, containers 10 can be positioned at different depths of tank liquid 102 as illustrated in FIG. 7.

As mentioned above, the multiple containers of a compliant volume system can be strategically arranged in a tank for a particular application. By way of non-limiting examples, the isolated plan views of a tank and its containers for the purpose of showing exemplary container distributions are illustrated in FIGS. 8A-8C. In FIG. 8A, containers 10 are distributed about the inside periphery of a tank 100. FIG. 8B illustrates a distribution of smaller containers 10 at the tank's periphery and a larger container 10 at the tank's central region. In FIG. 8C, containers 10 are clustered at a central region of tanks 100. Numerous other container distributions or arrangements can be employed without departing from the scope of the present invention.

In some embodiments of the present invention, each ballast tank of a floating structure can be equipped with a compliant volume system of the present invention. The resulting multiple compliant-volume systems can be placed in cross-coupled communication with one another. An example of a cross-coupled embodiment is illustrated in FIG. 9 where floating structure 200 has a centerline (e.g., bow-to-stern centerline, port-to-starboard centerline, etc.) indicated by dashed line 202. As is typical for many floating structures, ballast tanks 100 are provided on each of opposing sides of centerline 202. In this embodiment, container gases 22 from containers 10 in both tanks 100 are coupled via a common manifold 26 having a flow controller 28 disposed therein between the two sets of containers 10. The cross-coupled embodiment eliminates the need for pressurized gas reservoirs as it leverages the rocking motion of floating structure 200 about centerline 202. That is, the rising levels of container liquids 104 on one side of centerline 202 will be reciprocated with falling levels of container liquids 104 on the other side of centerline 202. The resulting pressure changes in container gases 22 are controlled by flow controller 28 to modify the motion of tank liquids 102.

The advantages of the present invention are numerous. The compliant-volume system and technique described herein require no moving parts. The system's simple and compact design can be easily implemented in various structures. The system can be designed to be sensitive to various frequencies depending on its configuration, e.g., multiple compliant volumes set to different frequencies, changing the pressure in the system to change the spring constant and height of a container liquid, changing the number of devices that are "turned on" during operation, etc. By being able to change frequencies during operation to account for changes in the environment, the present invention can adapt to changes in sea-state. The compliant-volume system and technique does not depend on slosh modes as is the case with a tuned slosh damper (TSD), and provides more control over the operational frequencies than a tuned liquid column damper (TLQD). The present invention's flexibility in terms of container size, shape, placement, etc., provides great design flexibility regardless of whether it is being implemented in a new or existing structure. The compliant-volume system and technique can be implemented on a variety of floating structures as described herein but it can also be used in other maritime or land-based applications. The system/technique could be implemented on any structure having liquid-containing tanks (e.g., ballast tanks, fuel tanks, water tanks, etc.).

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A system, comprising:
   only one tank;
   a continuous body of a liquid contained within said tank;
   a plurality of containers disposed in said tank, each container from said plurality of containers having only one open end, said each container disposed in said liquid wherein a portion of said liquid fills a portion of said each container to seal said one open end thereof and wherein a remainder of said each container is filled only with a gas; and
   at least one gas pressurization source, each said gas pressurization source in fluid communication with said remainder of at least one of said plurality of containers, said at least one gas pressurization source operable to adjust pressure of said gas in said containers in correspondence with a frequency of motion of said liquid contained within said tank to thereby modify the motion of said liquid contained within said tank.

2. A system as in claim 1, wherein said liquid comprises water.

3. A system as in claim 1, wherein said containers are distributed about said tank.

4. A system as in claim 1, wherein said containers are identical in configuration.

5. A system as in claim 1, wherein said containers are varied in configuration.

6. A system as in claim 1, wherein said containers are at identical depths of said liquid.

7. A system as in claim 1, wherein said containers are at varying depths of said liquid.

8. A system as in claim 1, wherein each said gas pressurization source includes a flow controller for controlling flow of said gas into and out of said each container.

9. A system as in claim 1, wherein said at least one gas pressurization source comprises:
- a manifold in fluid communication with said remainder of said each container; and
- a reservoir of a pressurized quantity of said gas in fluid communication with said manifold.

10. A system as in claim 9, further comprising a flow controller disposed between said manifold and said reservoir for controlling flow of said gas moving between said manifold and said reservoir.

11. A system, comprising:
- only one tank having a bottom;
- a continuous body of a liquid contained within said tank;
- a plurality of containers disposed in said liquid, each container from said plurality of containers having only one open end, said each container disposed at a fixed location in said liquid, said one open end of said each container facing said bottom of said tank wherein a portion of said liquid fills a portion of said each container to seal said one open end thereof and wherein a remainder of said each container is filled only with a gas interfaced with said portion of said liquid therein; and
- a gas pressurization source in fluid communication with said remainder of said each container, said gas pressurization source operable to adjust pressure of said gas in said containers in correspondence with a frequency of motion of said liquid contained within said tank to thereby modify the motion of said liquid contained within said tank.

12. A system as in claim 11, wherein said liquid comprises water.

13. A system as in claim 11, wherein said containers are distributed about said tank.

14. A system as in claim 11, wherein said containers are identical in configuration.

15. A system as in claim 11, wherein said containers are varied in configuration.

16. A system as in claim 11, wherein said containers are at identical depths of said liquid.

17. A system as in claim 11, wherein said containers are at varying depths of said liquid.

18. A system as in claim 11, wherein said gas pressurization source includes a flow controller for controlling flow of said gas into and out of said each container.

19. A system as in claim 11, wherein said gas pressurization source comprises:
- a manifold in fluid communication with said remainder of said each container; and
- a reservoir of a pressurized quantity of said gas in fluid communication with said manifold.

20. A system as in claim 19, further comprising a flow controller disposed between said manifold and said reservoir for controlling flow of said gas moving between said manifold and said reservoir.

21. A method, comprising:
- providing only one tank with a continuous body of a liquid contained therein;
- placing a plurality of containers in the liquid in the tank, each container from said plurality of containers having only one open end, said each container adapted to be disposed in the liquid wherein a portion of the liquid fills a portion of said each container to seal said one open end thereof and wherein a remainder of said each container is filled only with a gas interfaced with said portion of the liquid therein;
- applying pressure to said gas in said each container; and
- adjusting said pressure of said gas in each of said containers to modify movement of the liquid in the tank in correspondence with the frequency of the movement of the liquid in the tank.

22. A method according to claim 21, wherein the liquid comprises water.

23. A method according to claim 21, wherein said step of placing includes the step of distributing said containers about the tank.

24. A method according to claim 21, wherein said containers are identical in configuration.

25. A method according to claim 21, wherein said containers are varied in configuration.

26. A method according to claim 21, wherein said step of placing includes the step of positioning said containers at identical depths of the liquid.

27. A method according to claim 21, wherein said step of placing includes the step of placing said containers at varying depths of the liquid.

28. A method according to claim 21, wherein said step of adjusting includes the step of controlling flow of said gas into and out of said each container.

* * * * *